(12) United States Patent
Beyer et al.

(10) Patent No.: US 6,914,361 B2
(45) Date of Patent: Jul. 5, 2005

(54) MAGNETIC BEARING

(75) Inventors: Christian Beyer, Köln (DE); Heinrich Engländer, Linnich (DE); Josef Hodapp, Köln-Sülz (DE)

(73) Assignee: Leybold Vakuum GmbH, Cologne (DE)

( * ) Notice: Subject to any disclaimer, the term of this patent is extended or adjusted under 35 U.S.C. 154(b) by 102 days.

(21) Appl. No.: 10/383,342

(22) Filed: Mar. 7, 2003

(65) Prior Publication Data
US 2004/0174080 A1 Sep. 9, 2004

(51) Int. Cl.⁷ .................................................. H02K 7/09
(52) U.S. Cl. ................................... 310/90.5; 310/67 R
(58) Field of Search ............................. 310/90.5, 67 R

(56) References Cited

U.S. PATENT DOCUMENTS

| | | | |
|---|---|---|---|
| 4,036,565 A | | 7/1977 | Becker .................... 417/420 |
| 4,337,981 A | * | 7/1982 | Meinke .................... 310/90.5 |
| 4,340,260 A | * | 7/1982 | Forster et al. ............. 310/90.5 |
| 4,379,598 A | * | 4/1983 | Goldowsky ................ 310/90.5 |
| 4,609,332 A | | 9/1986 | Miki et al. ................. 417/352 |
| 5,686,772 A | | 11/1997 | Delamare ................. 310/90.5 |

FOREIGN PATENT DOCUMENTS

| | | |
|---|---|---|
| DE | 25 37 367 | 4/1976 |
| DE | 3341716 A1 | 5/1984 |
| DE | 19825854 | 12/1999 |
| DE | 10043235 | 3/2002 |
| EP | 664 410 | 7/1995 |
| JP | 2000283162 | 10/2000 |

\* cited by examiner

*Primary Examiner*—Thanh Lam
(74) *Attorney, Agent, or Firm*—Fay, Sharpe, fagan, Minnich & McKee, LLP

(57) ABSTRACT

The invention relates to a magnetic bearing having a fixed first bearing portion and a movable second bearing portion which is contactlessly supported on the first bearing portion. The first bearing portion (12) comprises a magnetic coil (42) generating a magnetic field and having a yoke (44). The second bearing portion (18) comprising a permanent magnet (50) which is magnetized in alignment with the yoke (44). The permanent magnet of the second bearing portion has an attracting effect upon the yoke of the first bearing portion. To avoid this, the first bearing portion is provided with a permanently magnetized compensation magnet (54) which is located opposite the permanent magnet (50) of the second bearing portion (18) and is magnetized oppositely to the permanent magnet (50).

12 Claims, 3 Drawing Sheets

MAGNETIC BEARING

BACKGROUND OF THE INVENTION

The invention relates to a magnetic bearing having a fixed first bearing portion and a movable second bearing portion which is contactlessly supported on the first bearing portion.

Magnetic bearings are e.g. employed for supporting motor rotors, pump rotors or other rotating parts, but also for supporting non-rotating parts, e.g. they may be used as damping and cushioning device between two non-rotating parts. A magnetic bearing generally comprises a fixed first bearing portion with a magnetic coil generating a magnetic field which is canalized by a yoke, and a second movable bearing portion. The second bearing portion comprises a permanent magnet of which magnetization is in alignment with the yoke. Depending on the direction of the magnetic field generated by the magnetic coil of the first bearing portion, the permanent magnet of the second bearing portion is either attracted or repelled such that the first bearing portion can generate both attracting and repelling forces acting upon the second bearing portion. It is a drawback of this configuration that the permanent magnet of the second bearing portion has an attracting effect upon the yoke of the first bearing portion such that always considerable attraction forces occur. Said attraction forces represent a biasing force which must be counteracted by a corresponding magnetic field of the magnetic coil of the first bearing portion, which results in a higher instability, a greater control complexity and a higher energy consumption.

SUMMARY OF THE INVENTION

It is an object of the present invention to improve the magnetic bearing. In the magnetic bearing according to the invention a permanently magnetized compensation magnet is provided on the first bearing portion, which compensation magnet is magnetized oppositely to the permanent magnet of the second bearing portion and arranged opposite the permanent magnet. The compensation magnet compensates for the force action which the permanent magnet of the second bearing portion exerts upon the yoke. This is effected by the compensation magnet being polarized oppositely to the permanent magnet of the second bearing portion such that the permanent magnet of the second bearing portion and the compensation magnet and thus the second bearing portion and the first bearing portion oppositely repel each other. The compensation magnet may be arranged, separated by an air gap, directly opposite the permanent magnet of the second bearing portion, it may however also be arranged at another place along the yoke. The compensation magnet almost completely compensates for the axial attraction forces between the permanent magnet of the second bearing portion and the yoke of the first bearing portion. Thus the axial bias within the magnetic bearing can be reduced to a minimum. In this manner, the second bearing portion can be maintained in an unbiased central position by correspondingly controlling the magnetic coil of the second bearing portion. When no bias exists, smaller magnetic coils can be employed for reliably controlling the central position of the second bearing portion. Due to the smaller controlling forces to be applied upon the magnetic coil the energy consumption and the heat generation by the magnetic coil can be considerably reduced.

According to a preferred embodiment, the magnetic bearing has an annular configuration, and the magnetic coil, the yoke, the permanent magnet of the second bearing portion and the compensation magnet define a ring-shaped arrangement. Thus a high tilting stability of the second bearing portion relative to the first bearing portion is realized. Further, the second bearing portion can rotate relative to the first bearing portion.

Preferably, a plurality of magnetic coils with segment-type yokes are provided, which are assembled to form a ring. Further, a plurality of distance sensors for sensing the position of the second bearing portion in the space may be arranged on the circumference of the ring and connected with a control device which controls the magnetic coils with the purpose of compensating for tilting movements of the second bearing portion. In this manner, tilting movements of the second bearing portion can be compensated for.

According to a preferred embodiment, the first bearing portion comprises an eddy current damping disk of an electrically conducting material, which is axially arranged between the permanent magnet of the second bearing portion and the yoke of the first bearing portion. Said eddy current damping disk damps radial movements of the second bearing portion with the aid of the eddy currents induced in the damping disk by radial movements of the second bearing portion. In this manner, effective radial damping in the plane of the annular magnetic bearing is realized.

According to a preferred embodiment, one free end of the yoke is arranged axially and the other free end of the yoke is arranged radially to the permanent magnet of the second bearing portion. By disposing the free yoke ends radially outside or radially inside the permanent magnet of the second bearing portion an unnested arrangement of the magnetic bearing portions is realized. The second bearing portion can be completely inserted from the side into the first bearing portion and completely removed from side out of the first bearing portion. This allows for simple assembly of the second bearing portion with the first bearing portion.

According to a preferred aspect, the magnetic coil can be arranged radially outside or radially inside the permanent magnet of the second bearing portion. The magnetic coil and the permanent magnets are arranged in approximately the same plane. Thus a compact configuration is realized.

According to a preferred aspect, the air gap between the yoke and the compensation magnet is inclined towards the transverse plane of the annular magnetic bearing. Due to the inclination of the air gap towards the transverse plane the area of the air gap is increased, i.e. the effective yoke areas lying opposite each other, the compensation magnet and the permanent magnet of the second bearing portion are increased. This allows for employment of larger magnets and realization of larger magnetic forces with radial force components.

Preferably, the magnetic bearing is a shaft bearing, wherein the first bearing portion is arranged on the stator side and the second bearing portion is arranged on the shaft side. The shaft may be part of an electric motor, a pump or another machine. The magnetic bearing is particularly suitable for high-speed shafts of electric motors and vacuum pumps. Preferably, the shaft magnetic bearing is an axial bearing.

According to a preferred aspect, the axial bearing is arranged approximately radially relative to the center of gravity of the shaft and between two shaft radial bearings which are disposed in axially spaced relationship to the center of gravity of the shaft. The center of gravity of the shaft is thus located between the two radial bearings, whereas the axial bearing is positioned approximately in the transverse plane of the center of gravity. With this arrangement a high tilting stability of the shaft is realized. Further, the axial bearing is arranged such that it may produce a high torque for generating a corresponding shaft tilting moment.

BRIEF DESCRIPTION OF THE DRAWINGS

Hereunder several embodiments of the invention are explained in detail with reference to the drawings in which.

DESCRIPTION OF PREFERRED EMBODIMENTS

FIGS. 1–5 show four embodiments of magnetic bearings 20,120,220,320 which are shaft bearings 10,110,210,310. The magnetic bearings 20,120,220,320 operate contactlessly and are thus particularly suitable for high speeds of up to 100,000 revolutions per minute and more. They are in particular used for supporting shafts in vacuum pumps, high-speed drive motors, supporting spindles etc.

The magnetic bearings 20,120,220,320 shown in FIGS. 1–5 are axial bearings of a high-speed pump, e.g. a vacuum pump, they may however also be bearings of other machine parts. Radial bearings for radially supporting the shafts are not shown.

Figure 1:
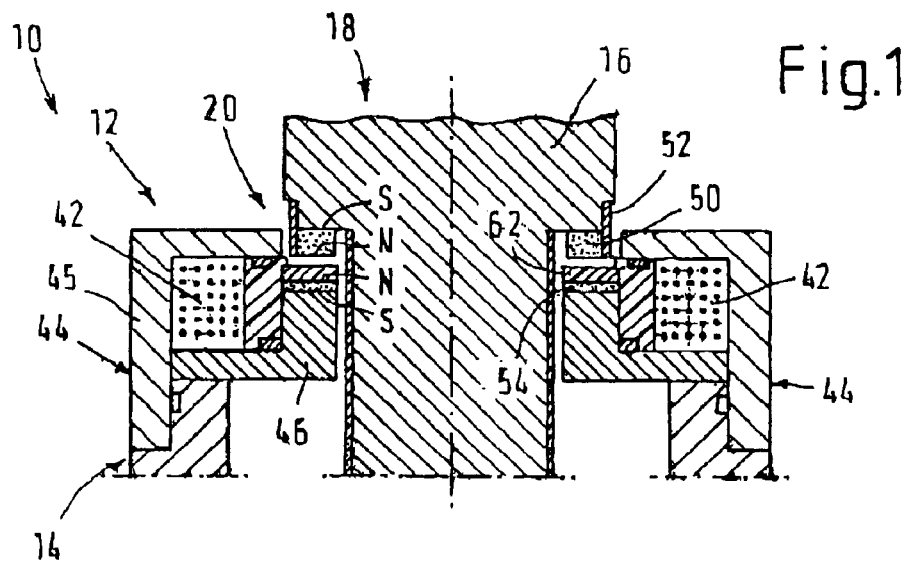
FIG. 1 shows a first embodiment of a magnetic bearing having a single magnetic coil.

The shaft bearing 10 shown in FIG. 1 comprises a fixed first bearing portion 12 configured as a fixed bearing element 14, a movable second bearing portion 18 configured as a rotating shaft 16, and the magnetic bearing 20 for axial support of the second bearing portion 18 on the first bearing portion 12.

The magnetic bearing 20 comprises an annular magnetic coil 42 generating a toroidal magnet field, said magnetic coil 42 being surrounded by a yoke 44. The magnetic coil 42 is arranged in an annular cavity of the yoke 44. The yoke 44 comprises two rings 45,46 of L-shaped cross-section, which define a frame of rectangular cross-section. At a radially inner corner the yoke is interrupted, i.e. it is of open configuration. The yoke 44 is preferably made of an iron composite material with 5% plastic material. This keeps the induction of eddy currents at a low level and accelerates the control of the magnetic bearing 20.

To the shaft 16 an axially magnetized annular permanent magnet 50 is fastened axially opposite the yoke 44, said permanent magnet 50 being fastened to and held on the shaft 16 by a sleeve 52. The magnetic field generated by the magnetic coil 42 exerts either an attraction or a repelling force in axial direction upon the shaft-side annular permanent magnet 50, depending on the polarization of the generated magnetic field, i.e. depending on the direction of the current flowing in the magnetic coil 42.

At the axial front end of the inner yoke ring 46 near the interruption of the ring a permanently axially magnetized annular compensation magnet 54 is fastened which is polarized oppositely to the shaft-side permanent magnet 50 such that the shaft-side permanent magnet 50 and the compensation magnet 54 repel each other. In this manner, the magnetic attraction forces acting between the annular shaft-side permanent magnet 50 and the inner yoke ring 46 are compensated to a large extent by corresponding repelling forces acting between the shaft-side permanent magnet 50 and the compensation magnet 54.

Thus an active axial magnetic bearing is realized which can act in both directions, i.e. which can be both attracting and repelling. By providing the compensation magnet 54, control can be effected about an approximately unbiased axial central position. Due to the unbiased state, only relatively small axial control forces are necessary for maintaining the axial central position of the shaft 16. This makes the use of a small magnetic coil 42 possible. Due to the reduced control capacity required, the heat generation in the magnetic coil 42 is reduced either.

The axial position of the shaft 16 relative to the fixed bearing element 14 is determined by a distance sensor which is not shown, which transmits a corresponding measuring signal to a control device which is not shown either. The control device supplies, as a function of the determined axial position, the velocity and the acceleration of the shaft 16, a corresponding control current to the magnetic coil 42 for correcting the axial position of the shaft 16 and maintaining the shaft 16 in its axial central position.

The fixed first bearing portion 12 comprises an eddy current damping disk 62 of a material with good electrical conductivity properties, e.g. copper, which is located axially in front of the compensation magnet 54. The damping disk 62 is thus arranged axially between the shaft-side permanent magnet 50 and the stator-side compensation magnet 54. During radial movements or vibrations of the shaft 16, the shaft-side permanent magnet 50 induces electric eddy currents in the damping disk 62. Thus the mechanical energy of the shaft 16 is inductively transmitted to the damping disk 62 and converted there into heat. In this manner, vibrations and oscillations of the shaft 16 are effectively damped.

Figure 2:
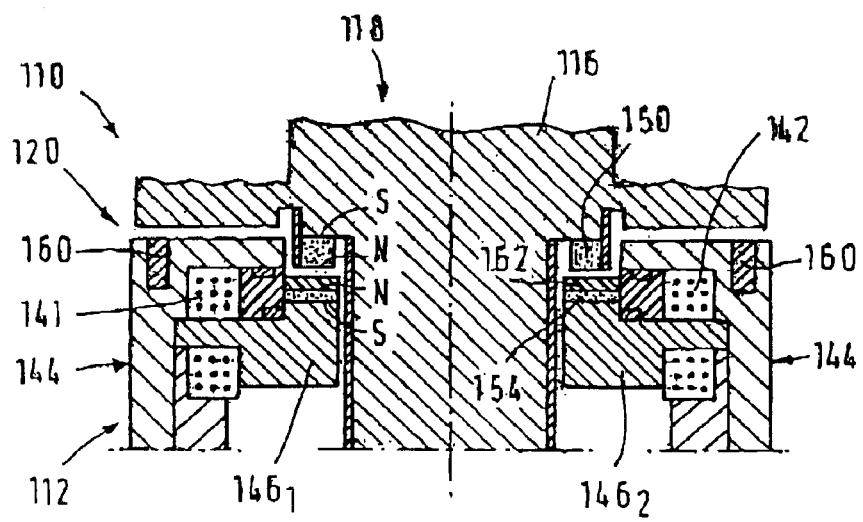
FIG. 2 shows a second embodiment of a magnetic bearing having three magnetic coils.
Figure 3:
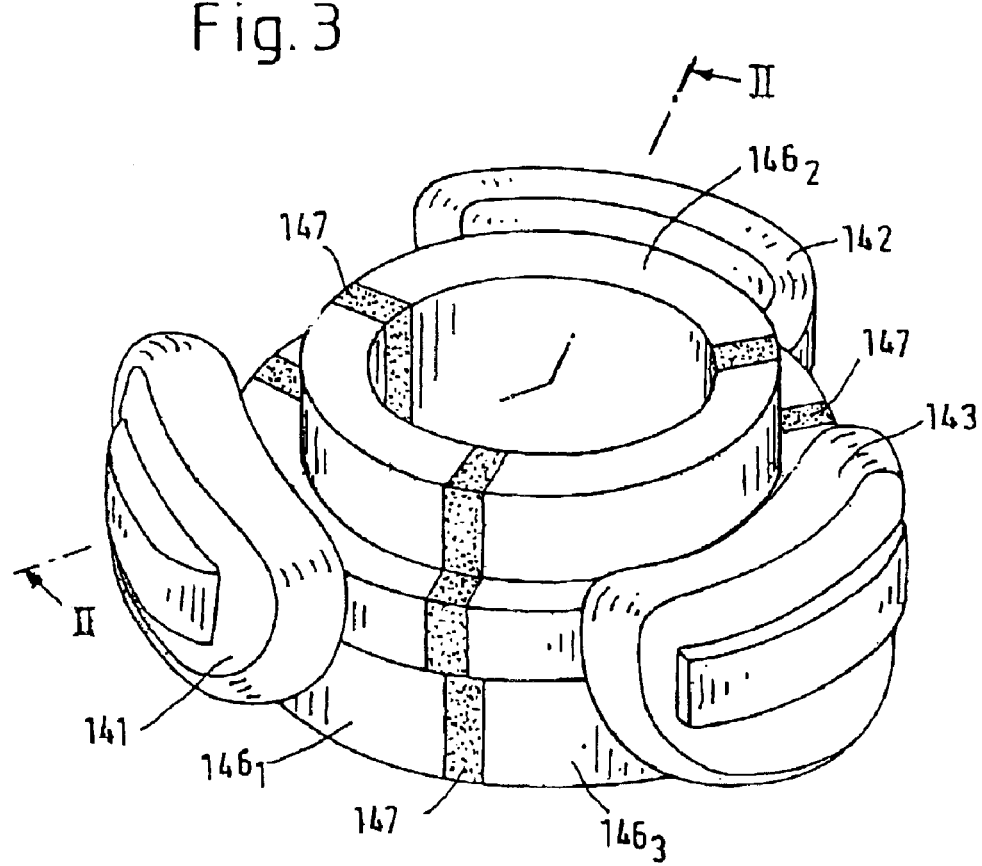
FIG. 3 shows the three magnetic coils with associated yokes of the magnetic bearing shown in FIG. 2.

In the embodiment of a shaft bearing 110 shown in FIG. 2, the magnetic bearing 120 has a different configuration in that it does not comprise one but three magnetic coils 141,142,143, three yokes 144, corresponding inner ring sections $146_1, 146_2, 146_3$ and corresponding yoke outer ring sections $145_1$–$145_3$, as can also be seen in FIG. 3. The remaining parts essentially correspond to those of the shaft bearing 10 shown in FIG. 1 and bear the corresponding reference numerals increased by 100. Between the yoke inner ring sections $146_1$–$146_3$ segments 147 of nonmagnetic material are arranged which magnetically separate the yoke ring sections $146_1$–$146_3$ from each other. Further, three distance sensors 160 are provided which determine, approximately in the transverse plane of the magnetic bearing 120, the axial distance from the shaft 116 to the fixed bearing portion 112. With the aid of the total of three axial distance sensors 160 the shaft position can be three-dimensionally sensed such that not only the axial deviations from the central position but also tilting movements of the shaft 116 can be sensed. With the aid of the magnetic coils 141–143, which are separately controlled by a control device, the tilting movements or tilting oscillations of the shaft 116 can be compensated.

Figure 4:
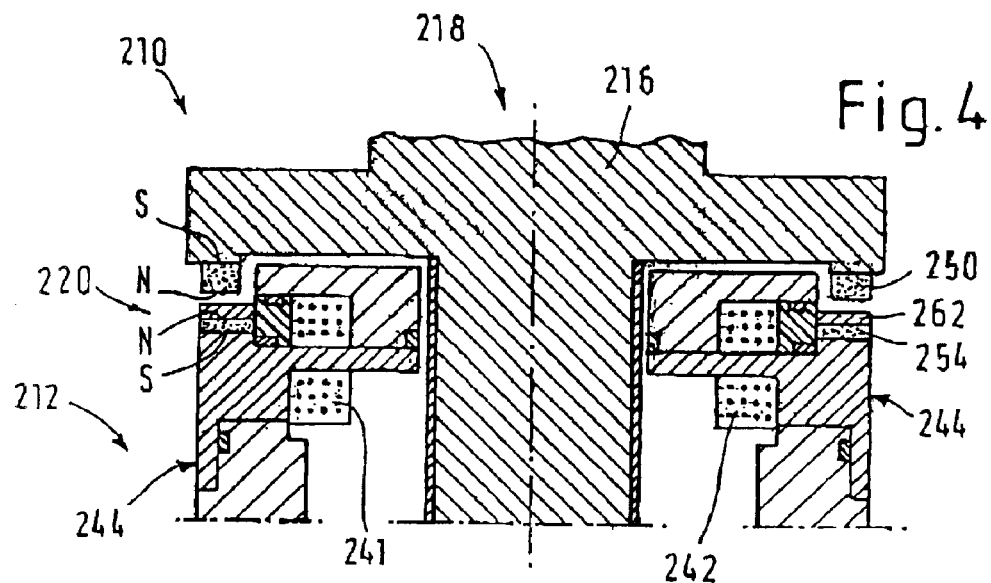
FIG. 4 shows a third embodiment of a magnetic bearing, wherein the permanent magnet of the second bearing portion and the compensation magnet are arranged radially outside the magnetic coil.

In the third embodiment of a shaft bearing 210 shown in FIG. 4 the magnetic bearing 220 comprises, radially on the inside, three magnetic coils 241,242, and a shaft-side permanent magnet 250, a compensation magnet 254 and a damping disk 262 radially on the outside of the magnetic coils 242. Due to the arrangement on the outside, larger permanent magnets can be used which generate a larger torque acting upon the shaft 216, and thus a better stabilizing effect. The larger permanent magnets increase the carrying force of the axial bearing. The parts of this shaft bearing 210 essentially correspond to those of the shaft bearing 10 shown in FIG. 1 and bear the corresponding reference numerals increased by 200.

Figure 5:
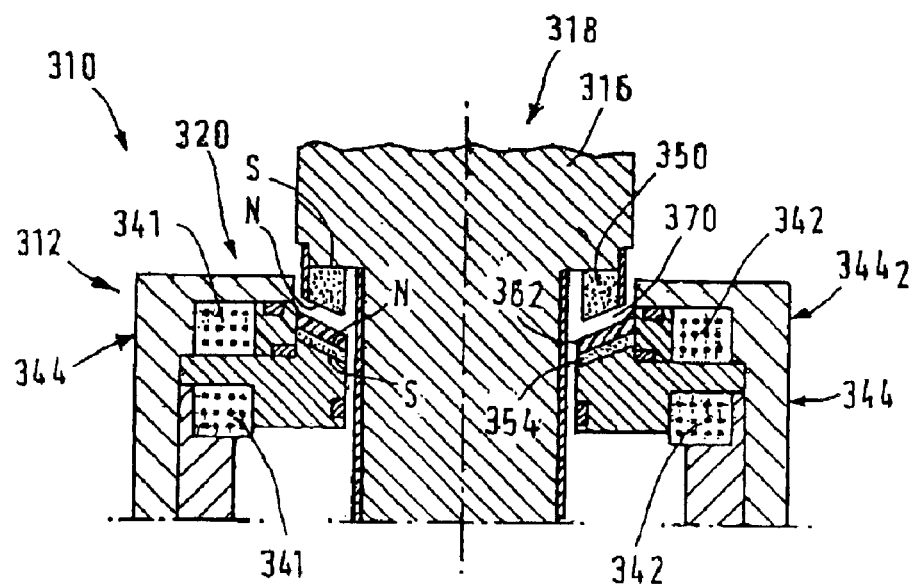
FIG. 5 shows a fourth embodiment of a magnetic bearing with air gap areas inclined towards the radial plane.

In the fourth embodiment of a shaft bearing 310 shown in FIG. 5 the shaft-side permanent magnet 350, the compensation magnet 354 and the damping disk 362 and thus the gap 370 formed between the damping disk 362 and the shaft-side permanent magnet 350 are not located exactly in a transverse plane but at an angle of approximately 15 degrees relative to the transverse plane. The magnetization direction of the magnets 350, 354 is also inclined by 15 degrees to the transverse plane. The magnetic forces transmitted between the fixed bearing portion 312 and the shaft 316 are thus increased and contain both an axial and a smaller radial component. In this manner, both the axial position of the shaft 316 and the radial position of the shaft 316 relative to the fixed bearing portion 312 can be controlled by a suitable control of the magnetic coils 342 with a yoke 344. Thus radial excursions and oscillations of the shaft 316 can be reduced to a minimum. The remaining parts essentially correspond to those of the shaft bearing 10 shown in FIG. 1 and bear the corresponding reference numerals increased by 300.

Due to the fact that the compensation magnet compensates for the attraction forces between shaft-side permanent magnets and yokes, the shaft is unbiased in its axial central position. Thus the axial central position of the rotor can be controlled with relatively small currents flowing in the magnetic coils. This allows for the use of small magnetic coils, leads to reduced heat generation and reduces the necessary energy consumption of the axial bearing.

Although preferred embodiments of the invention have been specifically illustrated and described herein, it is to be understood that minor variations may be made without departing from the spirit and scope of the invention, as defined in the appended claims.

Having thus described the preferred embodiments, the invention is now claimed to be:

1. A magnetic bearing comprising a fixed first bearing portion and a movable second bearing portion which is contactlessly supported on the first bearing portion, with
   the first bearing portion comprising a magnetic coil generating a magnetic field and having a yoke,
   the second bearing portion comprising a permanent magnet which is magnetized in alignment with the yoke, so that the magnetic field generated by the magnetic coil selectively exerts each one of an attraction force and a repelling force in axial direction upon the permanent magnet depending on the polarization of the generated magnetic field,
   wherein on the first bearing portion a permanently magnetized compensation magnet is provided which is located opposite the permanent magnet of the second bearing portion and is magnetized oppositely to the permanent magnet.

2. The magnetic bearing according to claim 1, wherein the magnetic bearing is of annular configuration and the magnetic coil, the yoke, the permanent magnet of the second bearing portion and the compensation magnet define a ring-shaped arrangement.

3. The magnetic bearing according to claim 2, wherein a plurality of magnetic coils having yokes define a ring-shaped arrangement.

4. The magnetic bearing according to claim 1, wherein the first bearing portion comprises an eddy current damping disk of electrically conducting material which is axially arranged between the permanent magnet of the second bearing portion and the yoke.

5. The magnetic bearing according to claim 1, wherein a plurality of distance sensors are provided in a single transverse plane for the purpose of sensing the position of the second bearing portion, and are connected with a control device which controls the magnetic coils for compensating for tilting movements of the second bearing portion.

6. The magnetic bearing according to claim 1, wherein one free end of the yoke is arranged axially and the other free end of the yoke is arranged radially to the permanent magnet of the second bearing portion.

7. The magnetic bearing according to claim 1, wherein the magnetic coil is arranged radially outside or radially inside the permanent magnet of the second bearing portion.

8. A magnetic bearing comprising:
   a first bearing portion comprising a magnetic coil generating a magnetic field and having a yoke,
   a second bearing portion which is contactlessly supported on the first bearing portion and comprising a second bearing portion permanent magnet in alignment with the yoke, and
   a permanently magnetized compensation magnet provided on the first bearing portion located opposite the second bearing portion permanent magnet and magnetized oppositely to the permanent magnet, an air gap being defined between the yoke and the second bearing portion permanent magnet which gap is inclined towards a transverse plane.

9. A shaft bearing having a magnetic bearing according to claim 1, wherein the first beating portion is arranged on the stator side and the second bearing portion is arranged on the shaft side.

10. The shaft bearing according to claim 9, wherein the shaft magnetic bearing is an axial bearing.

11. A shaft bearing having an annular magnetic bearing including a fixed first bearing portion and a movable second bearing portion which is contactlessly supported on the first bearing portion, with
   the first bearing portion being arranged on a stator side and comprising a magnetic coil generating a magnetic field and having a yoke,
   the second bearing portion being arranged on a shaft side and comprising a permanent magnet disposed to interact magnetically with the yoke,
   on the first bearing portion, a permanently magnetized compensation magnet being located opposite the permanent magnet of the second bearing portion and being magnetized oppositely to the permanent magnet, and,
   the magnetic coil, the yoke, the permanent magnet of the second bearing portion and the compensation magnet defining a ring-shaped arrangement.

12. The shaft bearing according to claim 9, wherein the magnetic bearing is arranged approximately radially relative to the center of gravity of the shaft and between two shaft radial bearings which are arranged in an axially spaced relationship to the center of gravity of the shaft.

* * * * *